Patented Aug. 16, 1932

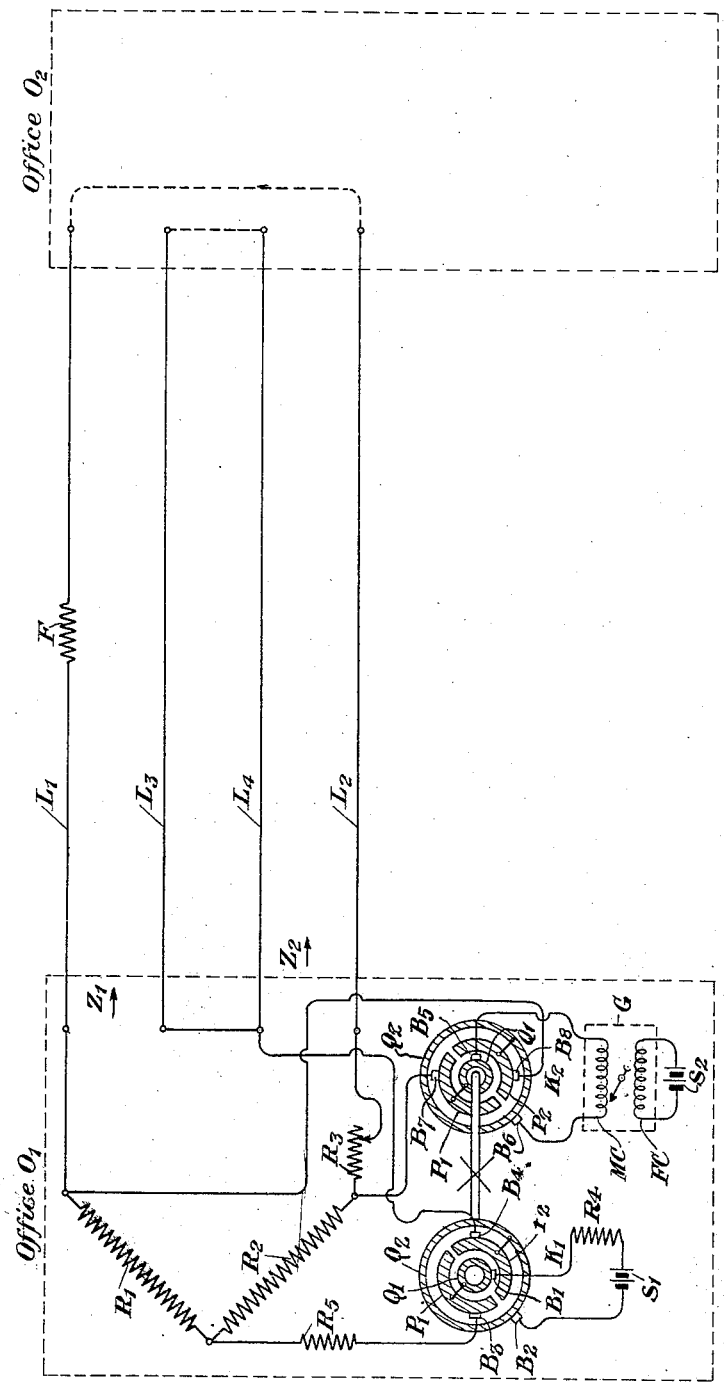

1,871,967

UNITED STATES PATENT OFFICE

PAUL G. EDWARDS AND THOMAS C. HENNEBERGER, OF BLOOMFIELD, NEW JERSEY, ASSIGNORS TO AMERICAN TELEPHONE AND TELEGRAPH COMPANY, A CORPORATION OF NEW YORK

ELECTRICAL TESTING SYSTEM

Application filed March 13, 1930. Serial No. 435,547.

This invention relates generally to electrical testing systems. More particularly this invention relates to arrangements for measuring and locating resistance unbalances in cable circuits.

One of the objects of this invention is to provide arrangements for determining accurately the location and the magnitude of a resistive fault in the conductor of a cable circuit.

Another of the objects of this invention consists in the provision of apparatus for the continuous application of alternating current of low frequency to one diagonal of a Wheatstone bridge circuit, one of the arms of which includes a faulty conductor, including apparatus for deriving from the other diagonal of the bridge a steady direct current, whereby the location and magnitude of the fault may be accurately determined.

While this invention will be pointed out with particularity in the appended claims, the invention itself, both as to its further objects and features, may be better understood from the detailed description hereinafter following, when read in connection with the accompanying drawing showing one embodiment of the invention merely for the purpose of illustration.

Referring to the drawing, the reference character $L_1$ designates a conductor extending between a nearby office $O_1$ and a distant office $O_2$. This conductor may have a fault designated F some distance from the nearby office $O_1$. This fault may be caused by a poorly soldered connection, by the careless joining of one part of the conductor with the other, or by any other form of partial disconnection. A Wheatstone bridge arrangement, to be subsequently described, will be employed to determine the size of the resistive fault F and its location.

Reference characters $L_2$, $L_3$ and $L_4$ represent three other conductors which may also extend between offices $O_1$ and $O_2$. These should be good conductors in the same cable as the faulty conductor. Preferably conductor $L_2$ should be the mate of conductor $L_1$ and conductors $L_3$ and $L_4$ may be the conductors of the other pair of the same quad. It is to be noted that ground may be substituted for conductors $L_3$ and $L_4$, if desired. Conductors $L_3$ and $L_4$ are connected together, both at the nearby or measuring office $O_1$ and at the distant office $O_2$. At the distant office $O_2$, conductor $L_1$ is connected to $L_2$.

Resistances $R_1$ and $R_2$ form two of the arms of the Wheatstone bridge circuit and these are preferably equal resistances. The impedance $Z_1$ between the conductor $L_1$ and the short-circuited conductors $L_3$, $L_4$ may be considered as a third arm of the bridge, and the impedance $Z_2$ between the conductor $L_2$ and the short-circuited conductors $L_3$, $L_4$ may be considered along with a rheostat $R_3$ to form the fourth arm of the bridge.

The source of excitation of the Wheatstone bridge arrangement is connected to one of the diagonals of the bridge through a commutator $K_1$ which is associated with motor driven apparatus (motor not shown). The current derived from the other diagonal of the bridge arrangement is transmitted to a galvanometer G through another commutator $K_2$. Commutators $K_1$ and $K_2$ are mechanically coupled to each other in any well known manner and they are revolved at the same speed, preferably a low speed, as, for example, four revolutions a second. Each commutator has two segments designated $P_1$ and $P_2$ and two slip rings designated $Q_1$ and $Q_2$, the segment $P_1$ being connected to the slip ring $Q_1$ and the segment $P_2$ being connected to the slip ring $Q_2$. Brushes $B_1$ and $B_2$ are associated with the slip rings $Q_1$ and $Q_2$ of commutator $K_1$, respectively, and brushes $B_3$ and $B_4$ are associated alternately with the segments $P_1$ and $P_2$ of this commutator and these form the respective input and output pairs of brushes of the commutator $K_1$. Brushes $B_5$ and $B_6$ and brushes $B_7$ and $B_8$ are similarly associated with the corresponding slip rings and segments bearing the same reference characters which are associated with the commutator $K_2$ and these form the respective output and input pairs of brushes of the commutator $K_2$. It is to be noted that brushes $B_3$ and $B_4$ are physically displaced by approximately 90 degrees with respect to brushes $B_7$ and $B_8$. The two commutators thus reverse their respective connections approximately 90 degrees apart.

The alternating potential for one of the diagonals of the Wheatstone bridge arrangement is obtained from a unidirectional source which may be a battery designated $S_1$, connected to the input brushes $B_1$ and $B_2$ of the commutator $K_1$ through a protective resistance $R_4$. The output brushes $B_3$ and $B_4$ are connected to the diagonal of the bridge arrangement through another resistance $R_5$. Thus, it will be apparent that this diagonal of the bridge arrangement is supplied with an alternating potential, the frequency of which will be equal to the number of revolutions per second made by the commutating apparatus.

A current detecting device G includes a moving coil MC and a fixed coil FC which are mutually reactive. The fixed coil FC of this device is connected to a source of unidirectional current which may be a battery designated $S_2$ and this provides a steady magnetic field for the device. If desired, a permanently magnetized element may be used in place of source $S_2$ and coil FC. The moving coil MC is connected to the brushes $B_5$ and $B_6$ of the commutator $K_2$. The second diagonal of the bridge includes the brushes $B_7$ and $B_8$ of the latter commutator.

As is well known, a reading is obtained on the current detecting device G by reason of the reaction of one of its coils upon the other and the pointer of this device will not be deflected when either of these coils is unexcited or when the currents through these coils are in quadrature. By virtue of the connection of the brushes $B_7$ and $B_8$ of the commutator $K_2$ in a diagonal of the bridge arrangement, an alternating potential will be impressed upon these brushes the frequency of which will be equal to that of the alternating potential impressed upon the other diagonal of the bridge. The voltage impressed on brushes $B_7$ and $B_8$ will be approximately 90 degrees out of phase with respect to the voltage impressed on the other diagonal of the arrangement by brushes $B_3$ and $B_4$. The commutator $K_2$ is employed for the purpose of converting this alternating potential into a practically steady direct current and, therefore, the deflection of the pointer of the detecting device G will be deflected through an angle proportional to the amplitude of the direct current. When the bridge arrangement becomes balanced upon the adjustment of the rheostat $R_3$, the current through the moving coil MC of the detecting device G will be reduced to zero and the pointer of this device will be returned to its mid-position. It is to be noted that the apparatus of this invention continually applies an alternating potential to one of the diagonals of the bridge arrangement and an alternating potential of the same frequency which is approximately in quadrature with that potential will be impressed upon the other diagonal of the bridge arrangement and the commutator $K_2$ will convert the alternating potential in the latter diagonal of the bridge arrangement into a steady direct current which may be reduced to zero by balancing the bridge arrangement.

At the distant office $O_2$ the conductor $L_1$ may be strapped to the conductor $L_2$ and the conductor $L_3$ similarly strapped to conductor $L_4$. If $Z_1$ be assumed to be the impedance looking at conductor $L_1$ and conductors $L_3$ and $L_4$ from the nearby office $O_1$, and $Z_2$ be assumed as the impedance looking at conductor $L_2$ and conductors $L_3$ and $L_4$ from the same office, then if there be no fault in the conductor $L_1$ or in any of the other conductors, $Z_1$ will be equal to $Z_2$. In that event the resistance of the rheostat $R_3$ will have to be reduced to zero in order that the detecting device G may indicate a condition of balance. Moreover, if a fault such as the one designated F be located at or very close to the distant office $O_2$, it will affect the impedances $Z_1$ and $Z_2$ equally and the resistance of the rheostat $R_3$ will again have to be reduced to zero in order to produce a balanced condition in the bridge arrangement as determined by the detecting device G.

When the fault F is located at or very close to the nearby office $O_1$, then the impedance $Z_1$ will be increased by the resistance of the fault F, while the impedance $Z_2$ will be only negligibly affected by the fault. Under these conditions the movable arm of the rheostat $R_3$ will have to be set so as to interpose a resistance equal to that of the fault F in order that a balanced condition may exist in the bridge arrangement, as determined by the detecting device G. The resistance interposed by the rheostat when the bridge is balanced may be termed its "effective resistance".

Thus, when there is no fault, or when the fault is at or very close to the distant office $O_2$, the effective resistance of the rheostat will be zero, and moreover, if the fault is at or very close to the nearby office $O_1$, the effective resistance of the rheostat R will be equal to the resistance of the fault. In general, the effective resistance of the rheostat $R_3$ will be directly proportional to the distance from the distant office $O_2$ to the fault F. By means of the calibrated dial associated with the movable arm of the rheostat $R_3$, it will be possible to quickly and accurately determine the location of the fault F. If D be assumed to equal the ratio of the distance of the fault from the distant office $O_2$ to the distance between the offices $O_1$ and $O_2$, then the effective resistance of the rheostat $R_3$ will be equal to the product of the fault resistance F and D.

It will be apparent from the description given hereinabove that the potential applied to one of the diagonals of the Wheatstone bridge arrangement will produce an alternating current of low and predetermined frequency. If the bridge arrangement is unbalanced, a potential will be present in its other diagonal which will produce an alternating current of the same frequency but which will be displaced in phase by 90 degrees with respect to the potential impressed upon the first diagonal. The brushes of the commutator $K_2$ are so displaced with respect to the brushes located about the commutator $K_1$ that the potential present in the balancing diagonal of the bridge may be converted into a steady direct current. If the resistance of the rheostat $R_3$ is too large, current will flow through the moving coil MC of the detecting device G in one direction, causing a corresponding deflection of the pointer of this device. By decreasing the resistance of the rheostat $R_3$, the direct current flowing through the moving coil MC will be correspondingly decreased and this will, therefore, reduce the deflection of the pointer of the detecting device G. If the resistance of the rheostat $R_3$ is reduced below the value required for an accurate condition of balance in the bridge arrangement, then direct current will flow through the moving coil MC in the opposite direction, causing the pointer of the device G to be deflected to the other side of its graduated scale. The pointer of the galvanometer G will, however, rest in its mid-position at zero when the rheostat $R_3$ has been properly adjusted so that no current flows through the moving coil MC.

The value of the resistance interposed by the rheostat $R_3$ when the bridge arrangement is completely balanced, should be noted. Similar apparatus may then be connected to the conductors $L_1$, $L_2$, $L_3$ and $L_4$ at office $O_2$. It will then be necessary to strap together conductors $L_1$ and $L_2$ and conductors $L_3$ and $L_4$ at the office $O_1$. The rheostat at the distant office $O_2$ will then be adjusted until a balanced condition is there indicated. If $R_3$ and $R_3'$ be assumed to be the effective resistances of the rheostats located at offices $O_1$ and $O_2$, respectively, to produce conditions of balance at these offices, then $$R_3 + R_3' = F \quad (1)$$

and $$\frac{R_3}{R_3 + R_3'} = D \quad (2)$$

and $$\frac{R_3'}{R_3 + R_3'} = 1 - D \quad (3)$$

The effective resistances of the rheostats at offices $O_1$ and $O_2$ may be used to readily and accurately determine the magnitude as well as the location of the resistive fault in a conductor. If it should not be feasible to make measurements at the distant office $O_2$, the magnitude of the resistance F may be determined by the ordinary direct current Varley loop measurements, as is well understood in the art, and the location of the fault may be determined from the following expression:

$$\frac{R_3}{F} = D \quad (4)$$

It is to be noted that the moving coil MC of the detecting device G is connected to the balancing diagonal of the bridge arrangement through the commutator $K_2$ and that the fixed coil FC of this device is connected to a source of unidirectional current. The deflection of the pointer of the detecting device has been found to be considerably steadier under these conditions than when these coils are arranged so that the moving coil MC is directly connected to the balancing diagonal and the fixed coil FC is connected to the source $S_2$ through the commutating apparatus. If these coils are arranged as shown in the drawing, then the deflection of the moving element of the detecting device will be steady since there will be no inductive transient currents such as may be produced by reversals of the magnetic field established by field reversals.

While this invention has been shown in one particular embodiment merely for the purpose of illustration, it will be understood that this invention may be applied to other and widely varied organizations without departing from the spirit of the invention and the scope of the appended claims.

What is claimed is:

1. Apparatus for locating the position of a fault in a conductor, comprising two conductors connected to each other at the near and distant ends, a fourth conductor connected to the faulty conductor at the distant end, and a Wheatstone bridge arrangement for comparing the impedance looking into the circuit between the faulty conductor and said two conductors connected to each other with the impedance looking into the circuit between said two conductors and said fourth conductor.

2. Apparatus for locating the position of a fault in a conductor, comprising two conductors connected to each other at the near and distant ends, a fourth conductor connected to the faulty conductor at the distant end, a Wheatstone bridge arrangement for comparing the impedance looking into the circuit between the faulty conductor and said two conductors connected to each other with the impedance looking into the circuit between said two conductors and said fourth conductor, a source of alternating potential connected to one of the diagonals of said bridge, an indicating device, and a rectifier coupling the indicating device to the other of the diagonals of the bridge.

3. Apparatus for locating the position of a fault in a conductor, comprising two conductors connected to each other at the near and distant ends, a fourth conductor connected to the faulty conductor at the distant end, a Wheatstone bridge arrangement for comparing the impedance looking into the circuit between the faulty conductor and said two conductors connected to each other with the impedance looking into the circuit between said two conductors and said fourth conductor, and an adjustable resistance connected in series with said fourth conductor, the effective value of which indicates the location of the fault.

4. Apparatus for determining the magnitude and location of a fault in a conductor, comprising a second conductor, a third conductor connected to the faulty conductor at the distant end, and a Wheatstone bridge arrangement one arm of which is connected to the near ends of the faulty conductor and said second conductor and another arm of which is connected to the near ends of said second and third conductors, said Wheatstone bridge arrangement being employed for comparing the impedance looking into the circuit between the faulty conductor and the second conductor with the impedance looking into the circuit between the second conductor and the third conductor.

5. Apparatus for determining the magnitude and location of a fault in a conductor, comprising a second conductor, a third conductor connected to the faulty conductor at the distant end, a Wheatstone bridge arrangement one arm of which is connected to the near ends of the faulty conductor and said second conductor and another arm of which is connected to the near ends of said second and third conductors, means for applying an alternating potential to one diagonal of the bridge, an indicating device, and means coupling said indicating device to the other diagonal of the bridge for converting the potential derived from said other diagonal into a steady direct current, said Wheatstone bridge arrangement being employed for comparing the impedance looking into the circuit between the faulty conductor and the second conductor with the impedance looking into the circuit between the second conductor and the third conductor.

In testimony whereof, we have signed our names to this specification this 11th day of March, 1930.

PAUL G. EDWARDS.
  THOMAS C. HENNEBERGER.